US012812102B2

(12) United States Patent
Park et al.

(10) Patent No.: US 12,812,102 B2
(45) Date of Patent: *Nov. 24, 2026

(54) VIDEO ENCODING/DECODING METHOD AND APPARATUS

(71) Applicants: HYUNDAI MOTOR COMPANY, Seoul (KR); KIA CORPORATION, Seoul (KR)

(72) Inventors: Seung Wook Park, Yongin-si (KR); Jin Heo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/286,659

(22) Filed: Jul. 31, 2025

(65) Prior Publication Data

US 2025/0358409 A1 Nov. 20, 2025

Related U.S. Application Data

(63) Continuation of application No. 18/531,440, filed on Dec. 6, 2023, now Pat. No. 12,401,786, which is a
(Continued)

(30) Foreign Application Priority Data

Jun. 8, 2021 (KR) ........................ 10-2021-0074383
May 30, 2022 (KR) ........................ 10-2022-0066029

(51) Int. Cl.
*H04N 7/12* (2006.01)
*H04N 19/105* (2014.01)
(Continued)

(52) U.S. Cl.
CPC ........... *H04N 19/11* (2014.11); *H04N 19/105* (2014.11); *H04N 19/159* (2014.11); *H04N 19/176* (2014.11)

(58) Field of Classification Search
CPC .................................................... H04N 19/105
See application file for complete search history.

(56) References Cited

U.S. PATENT DOCUMENTS 10,142,623 B2 11/2018 Bang et al.
10,575,014 B2 2/2020 Bang et al.
(Continued)

FOREIGN PATENT DOCUMENTS

KR 20190056332 A 5/2019
KR 20190062300 A 6/2019
(Continued)

OTHER PUBLICATIONS

International Search Report and Written Opinion cited in corresponding PCT app No. PCT/KR2022/007761; Aug. 25, 2022; 11 pp.
(Continued)

*Primary Examiner* — Y Lee
(74) *Attorney, Agent, or Firm* — Lempia Summerfield Katz LLC

(57) ABSTRACT

A video encoding/decoding method and a video encoding/decoding apparatus are provided. The video decoding method includes determining at least two intra prediction modes based on intra prediction modes of neighboring blocks adjacent to a current block. The video decoding method further includes generating at least two prediction blocks using the at least two intra prediction modes. The video decoding method further includes generating a prediction block of the current block by performing a weighted average on the at least two prediction blocks.

14 Claims, 18 Drawing Sheets

Related U.S. Application Data continuation of application No. PCT/KR2022/007761, filed on May 31, 2022.

(51) Int. Cl.

| | |
|---|---|
| ***H04N 19/11*** | (2014.01) |
| ***H04N 19/159*** | (2014.01) |
| ***H04N 19/176*** | (2014.01) |

(56) References Cited

U.S. PATENT DOCUMENTS

| | | | | |
|---|---|---|---|---|
| 10,992,956 | B2 | 4/2021 | Bang et al. | |
| 11,350,107 | B2 | 5/2022 | Jun et al. | |
| 11,523,133 | B2 | 12/2022 | Bang et al. | |
| 12,676,990 | B2 * | 7/2026 | Panusopone | H04N 19/159 |
| 2014/0003518 | A1 | 1/2014 | Bang et al. | |
| 2019/0037239 | A1 | 1/2019 | Bang et al. | |
| 2020/0154136 | A1 | 5/2020 | Bang et al. | |
| 2020/0366900 | A1 | 11/2020 | Jun et al. | |
| 2021/0211651 | A1 | 7/2021 | Takehara | |
| 2021/0218993 | A1 | 7/2021 | Bang et al. | |
| 2022/0272357 | A1 | 8/2022 | Jun et al. | |
| 2022/0408111 | A1 | 12/2022 | Bang et al. | |
| 2023/0133166 | A1 | 5/2023 | Bang et al. | |
| 2023/0156220 | A1 | 5/2023 | Bang et al. | |
| 2023/0370618 | A1 | 11/2023 | Jun et al. | |
| 2026/0181185 | A1 * | 6/2026 | Huang | H04N 19/80 |
| 2026/0189688 | A1 * | 7/2026 | Chuang | H04N 19/105 |

FOREIGN PATENT DOCUMENTS

| | | | |
|---|---|---|---|
| KR | 20200101900 | A | 8/2020 |
| KR | 20210022755 | A | 3/2021 |

OTHER PUBLICATIONS

Jie Zhao et al., 'EE2-Related: Improvements of Decoder-Side Intra Mode Derivation; Document: JVET-V0087; Joint Video Experts Team (JVET) of ITU-T SG 16 WP 3 and ISO/IEC JTC 1/SC 29, 22nd Meeting, by teleconference, Apr. 2021; 7 pp.

* cited by examiner

| DIMD Index | DIMD Blend Mode |
|---|---|
| 0 | No DIMD |
| 1 | Blend predictions of 1st mode and 2nd mode |
| 2 | Blend predictions of 2nd mode ($w_2$ =2/3) and Planar ($w_p$ =1/3) |
| 3 | Blend predictions of 1st mode, 2nd mode and Planar ($w_p$ =5/9) |

FIG. 8

| | |
|---|---|
| MPM list generation process | L0 mode and A0 mode |
| Generation process 1 | Same directional mode |
| Generation process 2 | Different directional mode |
| Generation process 3 | Directional mode and non-directional mode |
| Generation process 4 | Non-directional mode(same non-directional mode or different non-directional mode) |

FIG. 11

| MPM list generation process | L0 mode and A0 mode | DIMD Blend Mode |
|---|---|---|
| Generation process 1 | Same directional mode | Blend prediction of directional mode and planar mode |
| Generation process 2 | Different directional mode | Blend predictions of L0 mode and A0 mode or Blend predictions of L0 mode, A0 mode and planar mode |
| Generation process 3 | Directional mode and non-directional mode | Blend prediction of directional mode and Planar mode |
| Generation process 4 | Non-directional mode (same non-directional mode or different non-directional mode) | No DIMD |

FIG. 13

| MPM list generation process | L0 mode and A0 mode | Weight value of DIMD blend mode |
|---|---|---|
| Generation process 1 | Same directional mode | Directional mode: 2/3, planar mode: 1/3 |
| Generation process 2 | Different directional mode | L0 mode: 1/2, A0 mode: 1/2 or L0 mode: 1/4, A0 mode 1/4 and planar mode: 1/2 |
| Generation process 3 | Directional mode and non-directional mode | Directional Mode: 1/2, planar mode: 1/2 |
| Generation process 4 | Non-directional mode (same non-directional mode or different non-directional mode) | No DIMD |

*FIG. 14*

VIDEO ENCODING/DECODING METHOD AND APPARATUS

CROSS-REFERENCE TO RELATED APPLICATIONS

This application is a continuation application of non-provisional U.S. patent application Ser. No. 18/531,440, filed on Dec. 6, 2023, which is a Continuation of International Application No. PCT/KR2022/007761, filed on May 31, 2022, which claims priority to Korean Patent Application No. 10-2021-0074383 filed on Jun. 8, 2021, and Korean Patent Application No. 10-2022-0066029 filed on May 30, 2022, the entire disclosures of which are incorporated herein by reference.

TECHNICAL FIELD

The present disclosure relates to a video encoding/decoding method and a video encoding/decoding apparatus, and more specifically, to a video encoding/decoding method and a video encoding/decoding apparatus for deriving an intra prediction mode of a current block from a Most Probable Mode (MPM) list.

BACKGROUND

The statements in this section merely provide background information related to the present embodiments and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and reproduces the decompressed video data. Video compression technologies include H.264/AVC, High Efficiency Video Coding (HEVC), and Versatile Video Coding (VVC), which has improved encoding efficiency by about 30% or more compared to HEVC.

However, since an image size, resolution, and frame rate gradually increase, the amount of data to be encoded also increases. Accordingly, a new compression technology providing higher encoding efficiency and an improved image enhancement effect than existing compression technologies is required.

Intra prediction is a prediction technology that allows only spatial reference and refers to a method of predicting a current block by referring to blocks already reconstructed around a block to be currently encoded. An encoder transmits intra prediction mode information of a block to be currently encoded to a decoder. A technology for deriving an intra prediction mode in a decoder (Decoder-side Intra Mode Derivation: DIMD) is a technology in which the encoder derives the intra prediction mode in a decoding process instead of transmitting the intra prediction mode information to the decoder. Since DIMD derives an intra prediction mode of a current block without receiving the intra prediction mode information from the decoder, encoding efficiency is improved, but there is a need to reduce complexity in the decoder.

SUMMARY

Technical Problem

An object of the present disclosure is to provide a method and an apparatus for deriving an intra prediction mode based on a Most Probable Mode (MPM) list.

Further, an object of the present disclosure is to provide a method and an apparatus for deriving an intra prediction mode without an encoder transmitting intra prediction mode information to a decoder.

Further, an object of the present disclosure is to provide a method and an apparatus for deriving an intra prediction mode based on a technology for deriving an intra prediction mode in a decoder (Decoder-side Intra Mode Derivation: DIMD).

Further, an object of the present disclosure is to provide a method and an apparatus for fixedly assigning a weight value of an intra prediction mode of a neighboring block.

Further, an object of the present disclosure is to provide a method and an apparatus for aligning an intra prediction mode derivation process with an MPM list generation process.

Further, an object of the present disclosure is to provide a method and an apparatus for improving video encoding/decoding efficiency.

Further, an object of the present disclosure is to provide a recording medium that stores a bitstream generated by using a video encoding/decoding method or a video encoding/decoding apparatus of the present disclosure.

Further, an object of the present disclosure is to provide a method and an apparatus for transmitting a bitstream generated by using a video encoding/decoding method or apparatus of the present disclosure.

Technical Solution

According to a present disclosure, a video decoding method includes determining at least two intra prediction modes based on intra prediction modes of neighboring blocks adjacent to a current block. The video decoding method further includes generating at least two prediction blocks using the at least two intra prediction modes. The video decoding method further includes generating a prediction block of the current block by performing a weighted average on the at least two prediction blocks.

In the video decoding method according to the present disclosure, the at least two intra prediction modes are candidate modes selected from a Most Probable Mode (MPM) list.

In the video decoding method according to the present disclosure, the at least two intra prediction modes are a first candidate mode and a second candidate mode in the MPM list.

In the video decoding method according to the present disclosure, the video decoding method further includes obtaining intra prediction mode information of the current block based on that the at least two intra prediction modes are non-directional modes. The video decoding method further includes generating the prediction block of the current block based on the intra prediction mode information.

In the video decoding method according to the present disclosure, the video decoding method further includes generating a prediction block using a planar mode and a prediction block using the same directional mode based on that the at least two intra prediction modes are the same directional mode. The video decoding method further includes generating the prediction block of the current block by performing a weighted average on the prediction block using a planar mode and the prediction block using the same directional mode.

In the video decoding method according to the present disclosure, the video decoding method further includes generating a prediction block using a planar mode and a prediction block using a directional mode based on that the at least two intra prediction modes are the directional mode and a non-directional mode. The video decoding method further includes generating the prediction block of the current block by performing a weighted average on the prediction block using the planar mode and the prediction block using the directional mode.

In the video decoding method according to the present disclosure, the video decoding method further includes obtaining a first information indicating whether to use only the at least two intra prediction modes other than a planar mode, based on that the at least two intra prediction modes are different directional modes.

In the video decoding method according to the present disclosure, the video decoding method further includes generating the at least two prediction blocks using the at least two intra prediction modes based on that the first information indicates that only the at least two intra prediction modes other than a planar mode are used. The video decoding method further includes generating the prediction block of the current block by performing a weighted average on the at least two prediction blocks.

In the video decoding method according to the present disclosure, the video decoding method further includes generating a prediction block using a planar mode and at least two prediction blocks using the at least two intra prediction modes based on that the first information does not indicate that only the at least two intra prediction modes other than the planar mode are used. The video decoding method further includes generating the prediction block of the current block by performing a weighted average on the prediction block using the planar mode and the at least two prediction blocks using the at least two intra prediction modes.

In the video decoding method according to the present disclosure, generating the prediction block of the current block by performing the weighted average on the at least two prediction blocks includes assigning fixed weight values to the at least two prediction blocks and adding these.

According to the present disclosure, a video encoding method includes determining at least two intra prediction modes based on intra prediction modes of neighboring blocks adjacent to a current block. The video encoding method further includes generating at least two prediction blocks using the at least two intra prediction modes. The video encoding method further includes generating a prediction block of the current block by performing a weighted average on the at least two prediction blocks.

In the video encoding method according to the present disclosure, the at least two intra prediction modes are selected from an MPM list and are a first candidate mode and a second candidate mode from the MPM list.

In the video encoding method according to the present disclosure, the video encoding method further includes encoding intra prediction mode information of the current block based on that the at least two intra prediction modes are non-directional modes.

In the video encoding method according to the present disclosure, the video encoding method further includes generating a prediction block using a planar mode and a prediction block using the same directional mode based on that the at least two intra prediction modes are the same directional mode. The video encoding method further includes generating the prediction block of the current block by performing a weighted average on the prediction block using a planar mode and the prediction block using the same directional mode.

In the video encoding method according to the present disclosure, the video encoding method further includes generating a prediction block using a planar mode and a prediction block using a directional mode based on that the at least two intra prediction modes are the directional mode and a non-directional mode. The video encoding method further includes generating the prediction block of the current block by performing a weighted average on the prediction block using the planar mode and the prediction block using the directional mode.

In the video encoding method according to the present disclosure, the video encoding method further includes encoding a first information indicating whether to use only the at least two intra prediction modes other than a planar mode, based on that the at least two intra prediction modes are different directional modes.

In the video encoding method according to the present disclosure, the video encoding method further includes generating the at least two prediction blocks using the at least two intra prediction modes based on that the first information indicates that only the at least two intra prediction modes other than a planar mode are used. The video encoding method further includes generating a prediction block of the current block by performing a weighted average on the at least two prediction blocks.

In the video encoding method according to the present disclosure, the video encoding method further includes generating a prediction block using a planar mode and at least two prediction blocks using the at least two intra prediction modes based on the first information does not indicate that only the at least two intra prediction modes other than the planar mode are used. The video encoding method further includes generating the prediction block of the current block by performing a weighted average on the prediction block using the planar mode and the at least two prediction blocks using the at least two intra prediction modes.

In the video encoding method according to the present disclosure, generating the prediction block of the current block by performing the weighted average on the at least two prediction blocks includes assigning fixed weight values to the at least two prediction blocks and adding these.

In addition, according to the present disclosure, it is possible to provide a method of transmitting a bitstream generated by the video encoding method or the video encoding apparatus according to the present disclosure.

In addition, according to the present disclosure, it is possible to provide a recording medium storing a bitstream generated by the video encoding method or apparatus according to the present disclosure.

In addition, according to the present disclosure, it is possible to provide a recording medium storing a bitstream received and decoded by the video decoding apparatus according to the present disclosure and used to reconstruct a video.

Advantageous Effects

According to the present disclosure, it is possible to provide a method and an apparatus for deriving an intra prediction mode based on the Most Probable Mode (MPM) list.

Further, according to the present disclosure, it is possible to provide a method and an apparatus for deriving an intra prediction mode without an encoder transmitting intra prediction mode information to a decoder.

Further, according to the present disclosure, it is possible to provide a method and an apparatus for deriving an intra prediction mode based on a technology for deriving an intra prediction mode in a decoder (Decoder-side Intra Mode Derivation: DIMD).

Further, according to the present disclosure, it is possible to provide a method and an apparatus for fixedly assigning a weight value of an intra prediction mode of a neighboring block.

Further, according to the present disclosure, it is possible to provide a method and an apparatus for aligning an intra prediction mode derivation process with an MPM list generation process.

Further, according to the present disclosure, it is possible to provide a method and an apparatus for improving video encoding/decoding efficiency.

The effects that can be acquired from the present disclosure are not limited to the effects mentioned above, and other effects not mentioned can be clearly understood by those having ordinary skill in the art from the following description.

BRIEF DESCRIPTION OF DRAWINGS

FIG. 8 is a diagram illustrating a DIMD blend mode in which a weight value is assigned to a prediction value of an intra prediction mode of a neighboring block according to a DIMD index according to an embodiment of the present disclosure.

FIG. 11 is a diagram illustrating the directionality of the intra prediction mode of the neighboring block according to the MPM list generation process according to an embodiment of the present disclosure.

FIG. 13 is a diagram illustrating a DIMD blend mode according to the MPM list generation process and the directionality of the intra prediction mode of the neighboring block according to an embodiment of the present disclosure.

FIG. 14 is a diagram illustrating a weight value assigned to a prediction value according to the intra prediction mode of the neighboring block according to the MPM list generation process and the directionality of the intra prediction mode of the neighboring block according to an embodiment of the present disclosure.

DETAILED DESCRIPTION

Figure 1:
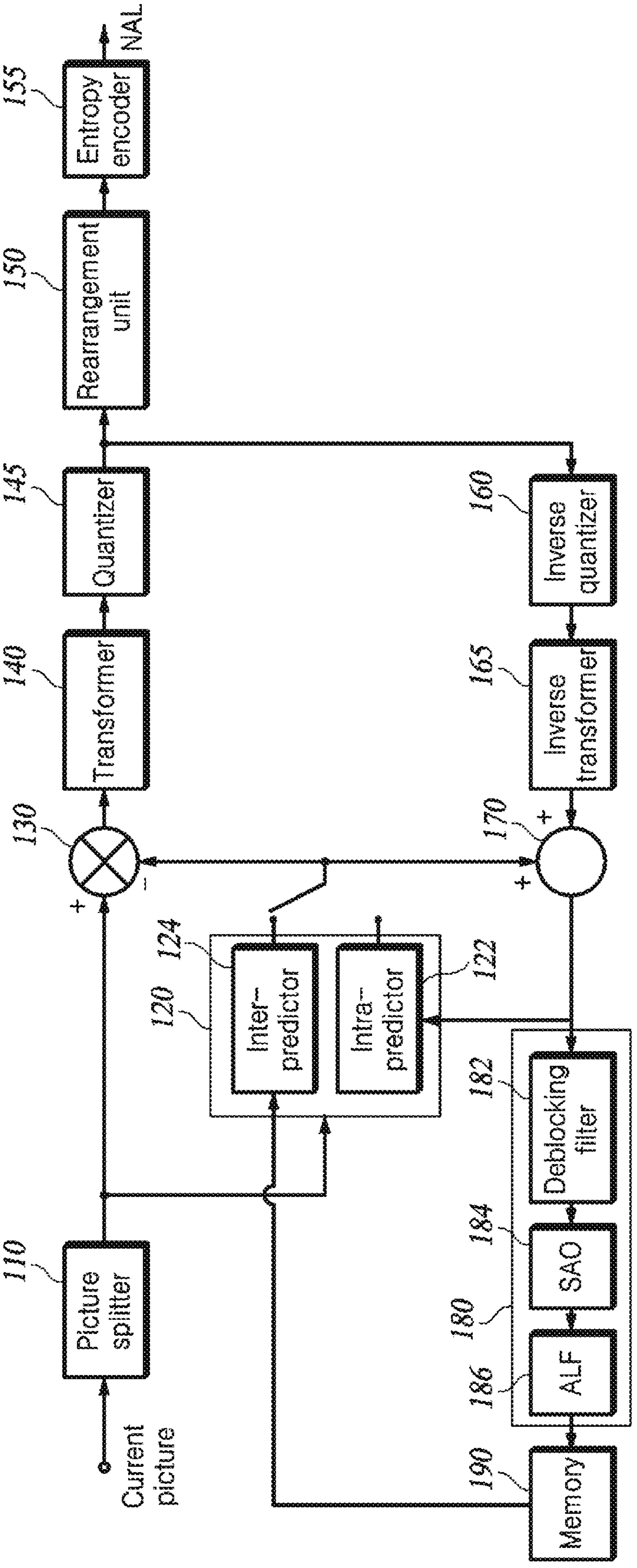
FIG. 1 is a block diagram of a video encoding apparatus that may implement a technology of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
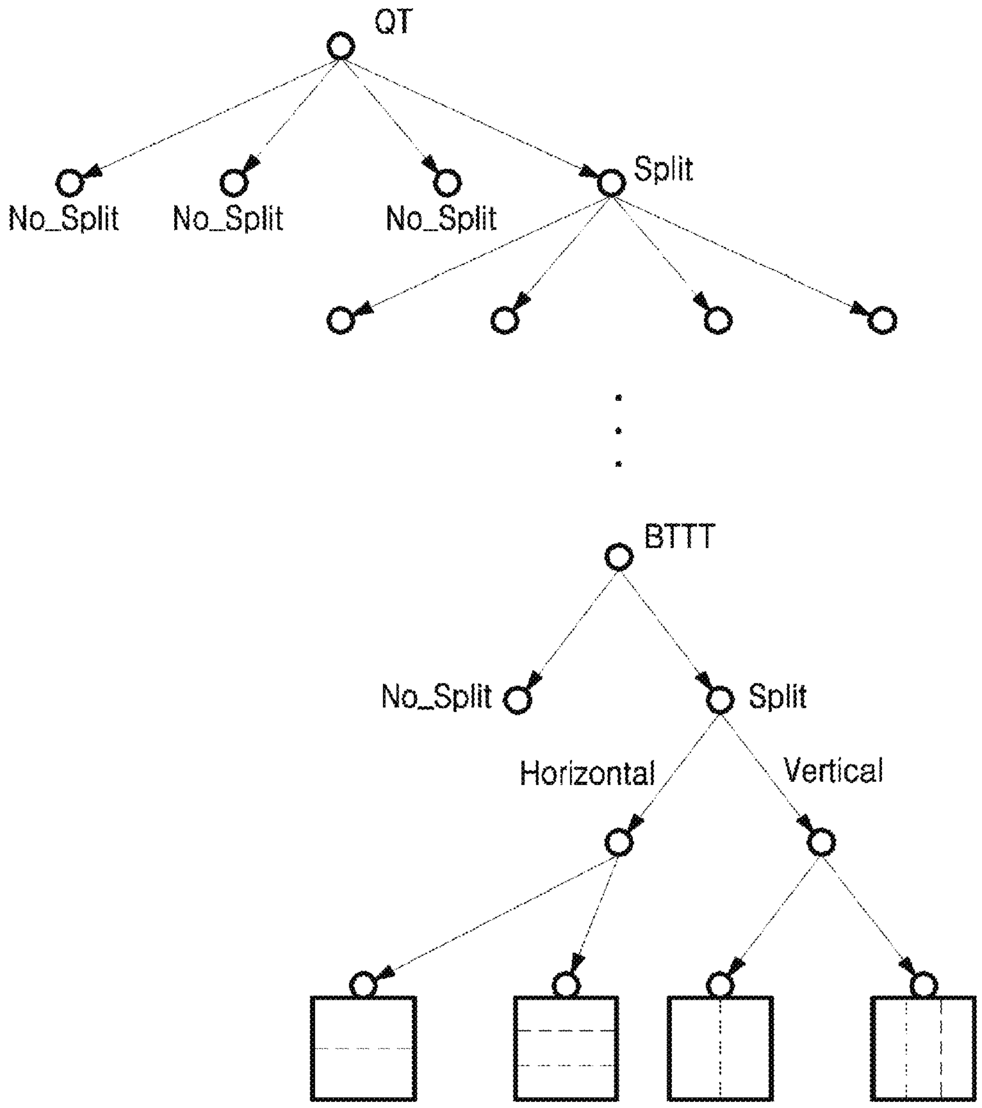
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split-_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
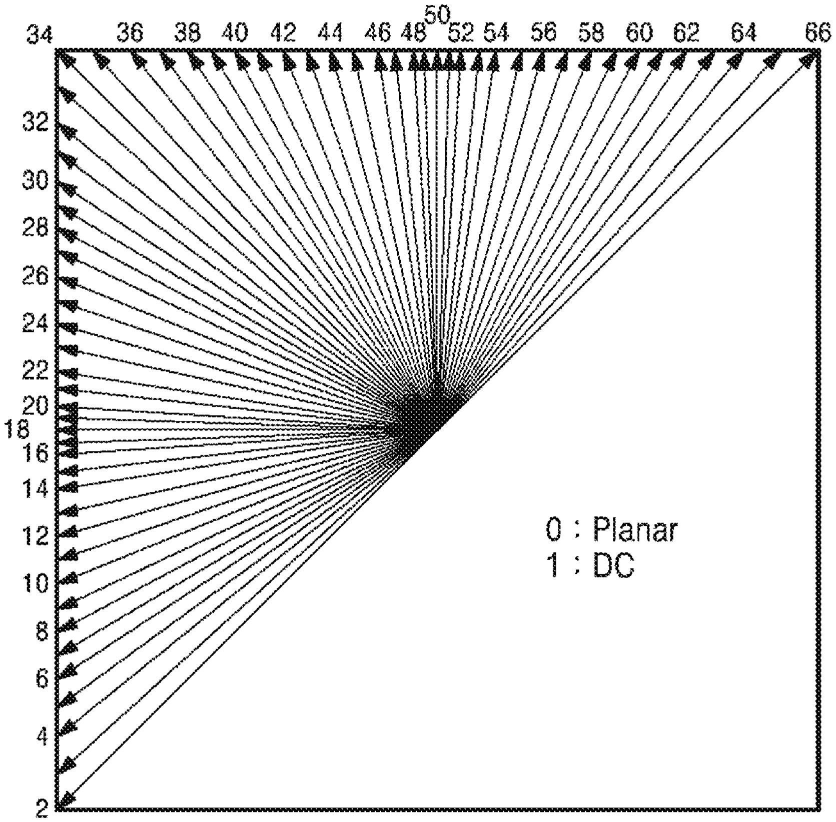
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
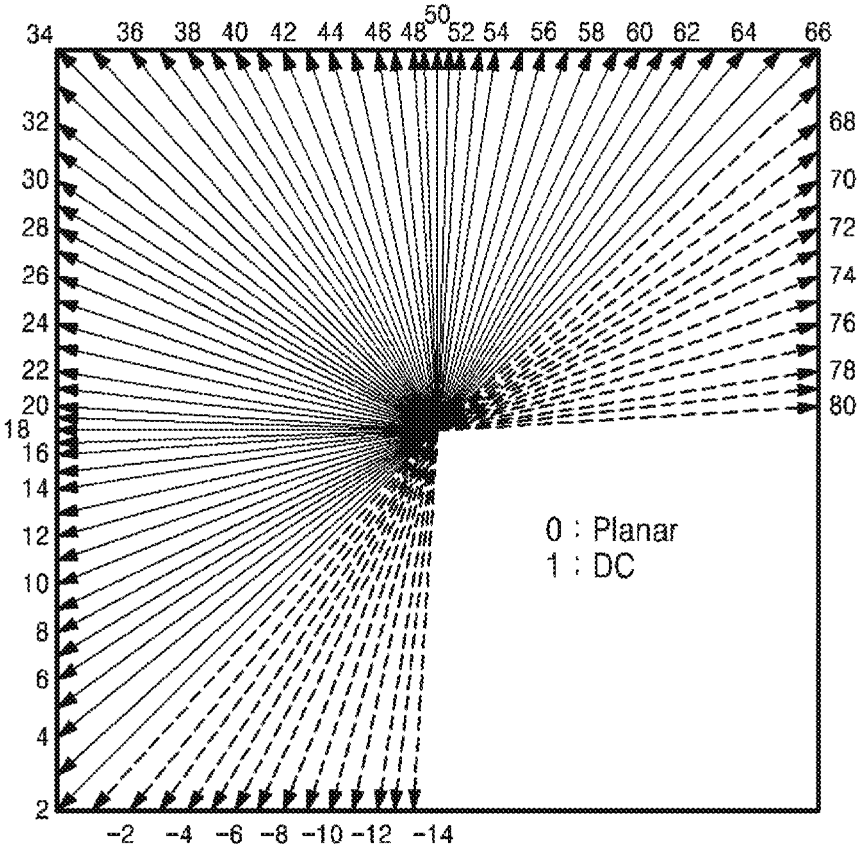

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
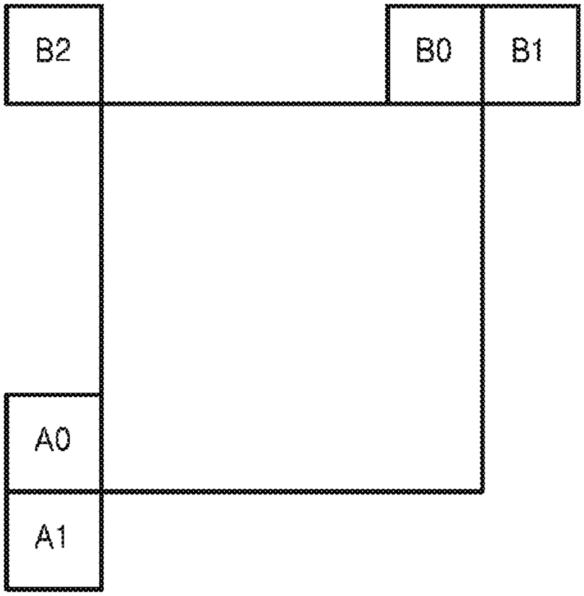
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
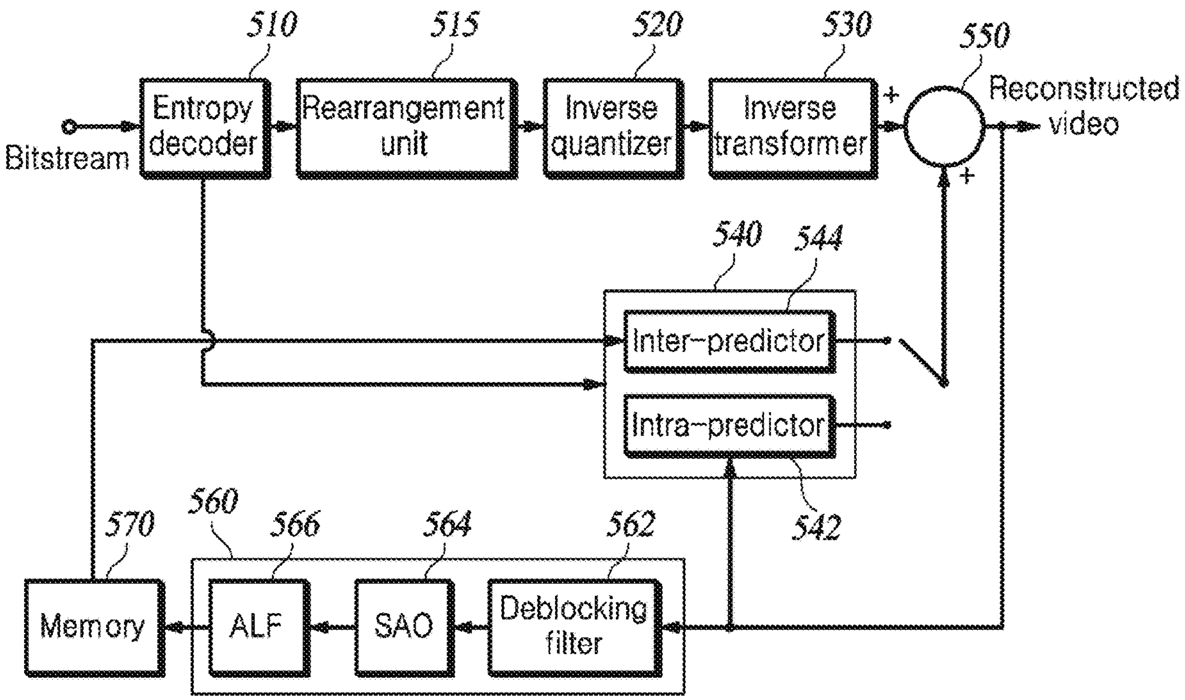
FIG. 5 is a block diagram of a video decoding apparatus that may implement technologies of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

Figure 6:
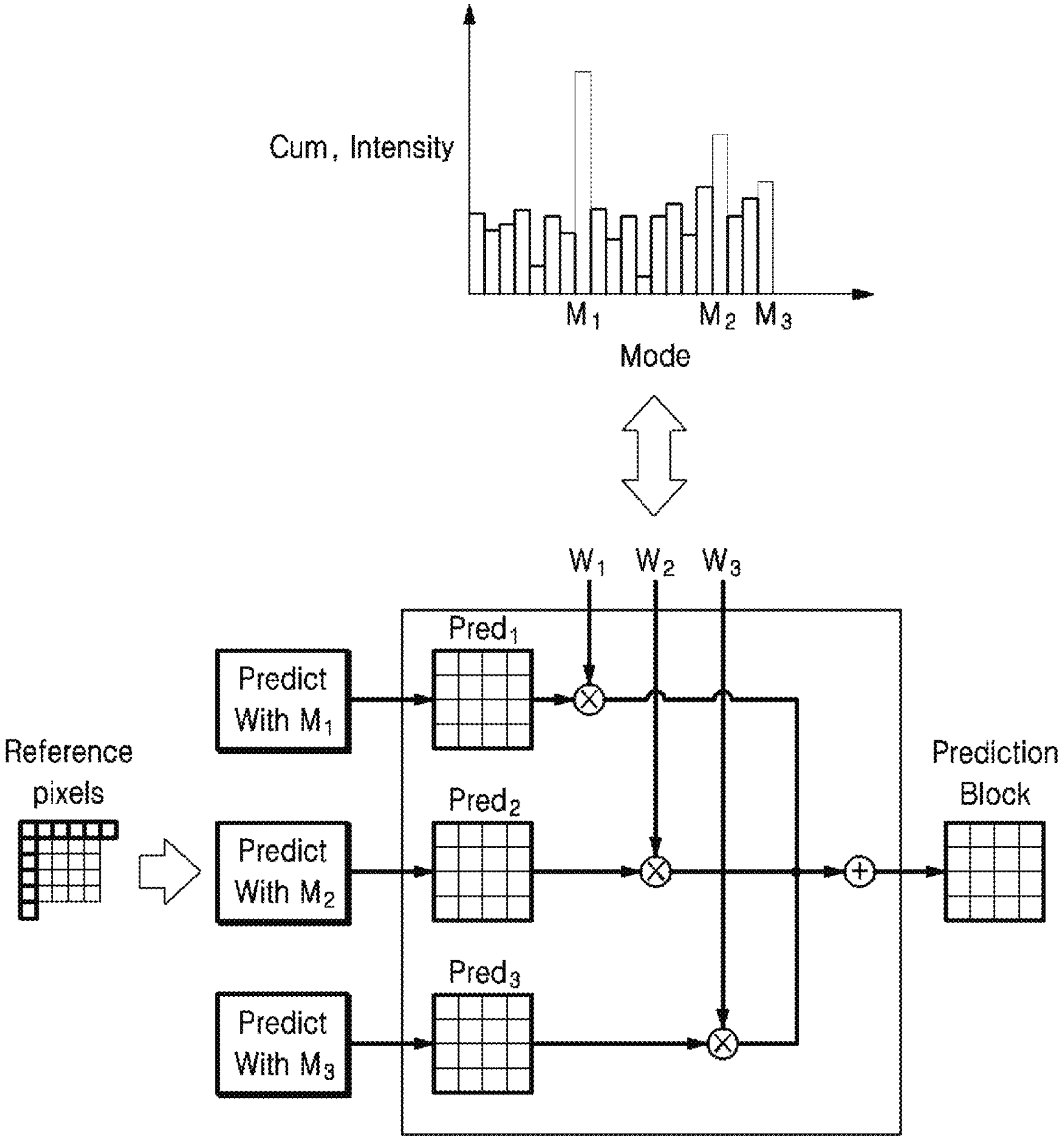
FIG. 6 is a diagram illustrating a process of generating a prediction block based on a technology for deriving an intra prediction mode in a decoder (Decoder-side Intra Mode Derivation: DIMD) according to an embodiment of the present disclosure.

FIG. 6 is a diagram illustrating a process of generating a prediction block based on a technology for deriving an intra prediction mode in a decoder (Decoder-side Intra Mode Derivation: DIMD) according to an embodiment of the present disclosure. In-picture prediction may have the same meaning as intra prediction. The DIMD may correspond to a method of deriving the intra prediction mode of the current block in a decoding process in the decoder without transmitting intra prediction mode information of the current block from the encoder to the decoder. In the DIMD, a Sobel Filter may be applied to neighboring pixels of the current block to calculate gradients of the pixels. A histogram of gradients (HoG) may be generated based on the calculated gradient. From the histogram of gradients, two gradients with the largest values may be selected, and an intra prediction mode for pixels with the two gradients may be derived. Weight values are assigned to prediction values of the two derived intra prediction modes and a prediction value of a planar mode, and a prediction block of the current block may be generated by adding these. Here, a fixed weight value of ⅓ may be assigned to the prediction value of the planar mode. Weight values to which ⅔ is distributed proportionally based on values of the gradients are assigned to the prediction values of the two derived intra prediction modes. A sum of the weight value assigned to the prediction value of the planar mode and the weight values assigned to the prediction values of the two derived intra prediction modes may correspond to 1.

Referring to FIG. 6, the prediction values of the intra prediction mode and the planar mode of two neighboring blocks adjacent to the current block may correspond to Pred1, Pred2, and Pred3, respectively. a weight value W1 may be assigned to Pred1, a weight value W2 may be assigned to Pred2, and a weight value W3 may be assigned to Pred3. The weight values are assigned to the respective prediction values, which may be summed to generate a prediction block of the current block. However, the present disclosure is not limited to the above embodiments.

Figure 7:
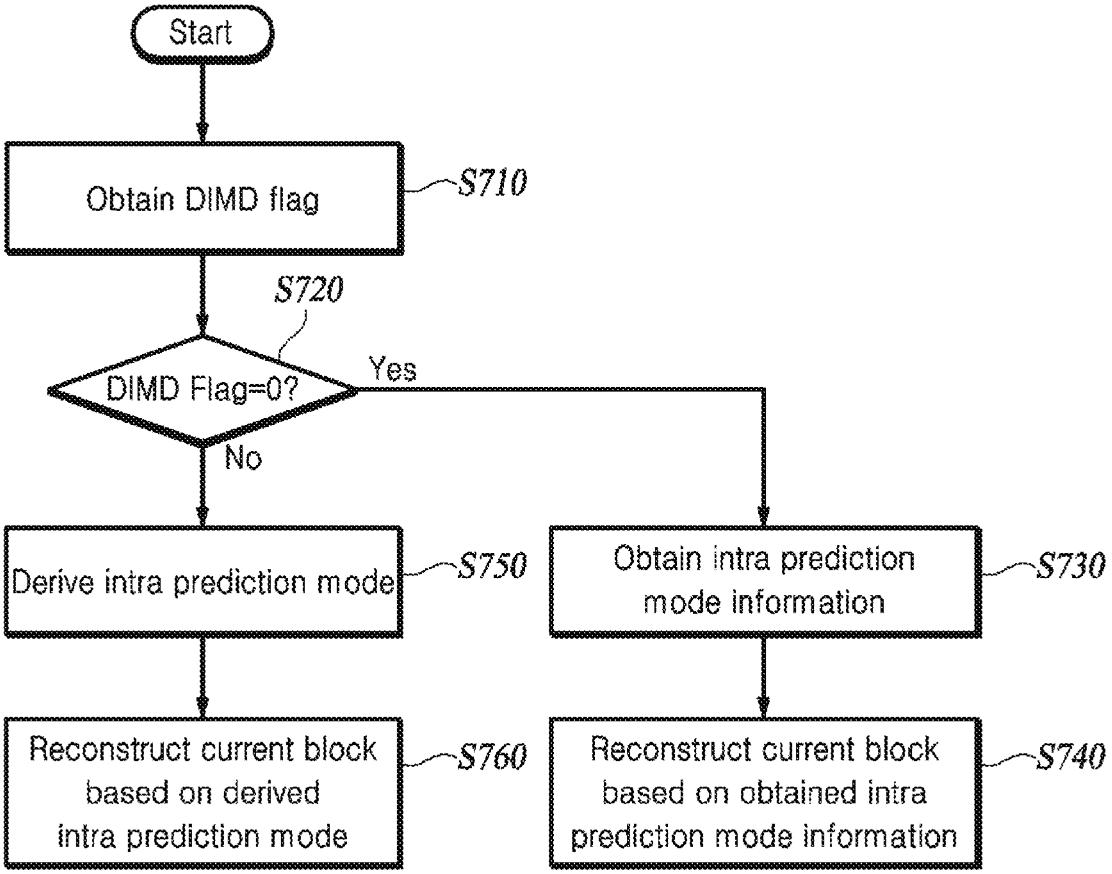
FIG. 7 is a diagram illustrating a DIMD-based decoding process according to an embodiment of the present disclosure.

FIG. 7 is a diagram illustrating a DIMD-based decoding process according to an embodiment of the present disclosure.

Referring to FIG. 7, the decoding apparatus may obtain information (for example, DIMD flag) indicating whether to derive the intra prediction mode of the current block based on the DIMD (S710). The DIMD flag having a first value (for example, 0) may indicate that the intra prediction mode of the current block is not derived based on the DIMD. The DIMD flag having a second value (for example, 1) may indicate that the intra prediction mode of the current block is derived based on the DIMD. A determination may be made as to whether the obtained DIMD flag has the first value (for example, 0) (S720). When the DIMD flag has the first value (for example, 0) (S720-YES), the decoding apparatus may obtain the intra prediction mode information of the current block (S730). The decoding apparatus may reconstruct the current block based on the obtained intra prediction mode information (S740). When the DIMD flag has the second value (for example, 1) (S720-NO), the decoding apparatus may derive the intra prediction mode of the current block based on the DIMD (S750). The decoding apparatus may reconstruct the current block based on the derived intra prediction mode of the current block (S760).

FIG. 8 is a diagram illustrating a DIMD blend mode in which a weight value is assigned to a prediction value of an intra prediction mode of a neighboring block according to a DIMD index according to another embodiment of the present disclosure. In the DIMD, a Sobel filter may be applied to the neighboring pixels of the current block to calculate the gradients of the pixels, and a histogram of the gradients may be generated based on the calculated gradients. Two gradients with the largest values may be selected from the histogram of the gradients, and an intra prediction mode for pixels with the two gradients may be derived. There may be the DIMD blend mode in which prediction values of two derived intra prediction modes are blended with the prediction value of the planar mode. The assignment of the weight value to the intra prediction mode may mean assignment of the weight value to a prediction value based on the intra prediction mode.

Referring to FIG. 8, the two derived intra prediction modes may correspond to a first mode and a second mode, respectively. A first blend mode may correspond to a mode in which the first mode and the second mode are blended. Here, a weight value of each mode may be determined based on the value of the gradient selected from the histogram. A second blend mode may correspond to a mode in which the second mode and the planar mode are blended. Here, a fixed weight value of ⅓ may be assigned to the planar mode and a fixed weight value of ⅔ may be assigned to the second mode. A third blend mode may correspond to a mode in which the first mode, the second mode, and planar mode are blended. Here, a fixed weight value of ⅙ may be assigned to the planar mode, and weight values to which ⅘ is distributed proportionally based on values of the gradients selected in the histogram may be assigned to the first mode and the second mode. Among the three modes, an optimal blend mode may be determined based on rate-distortion decision (RD decision). Information on the determined blend mode can be transmitted from the encoder to the decoder as a DIMD index. Here, the intra prediction mode information may not be transmitted to the decoder. When the DIMD index is a first value (for example, 0), the intra prediction mode of the current block may not be derived based on the DIMD. When the DIMD index is a second value (for example, 1), the intra prediction mode of the current block may be derived based on the first blend mode and the prediction block of the current block may be generated. When the DIMD index is a third value (for example, 2), the intra prediction mode of the current block may be derived based on the second blend mode and the prediction block of the current block may be generated. When the DIMD index is a fourth value (for example, 3), the intra prediction mode of the current block may be derived based on the third blend mode and the prediction block of the current block may be generated.

Figure 9:
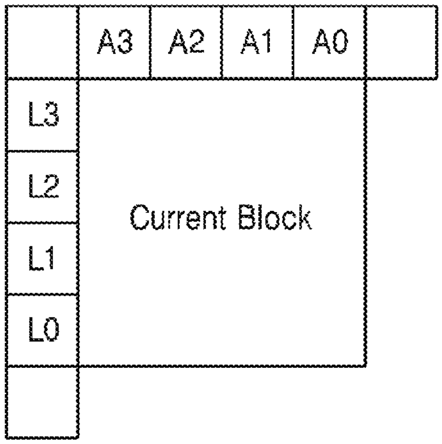
FIG. 9 is a diagram illustrating neighboring blocks adjacent to the current block according to an embodiment of the present disclosure.

FIG. 9 is a diagram illustrating the neighboring blocks adjacent to the current block according to an embodiment of the present disclosure. The present disclosure can reuse an MPM list that is used in a process of transmitting the intra prediction mode information to derive an efficient intra prediction mode. It is possible to derive the intra prediction mode at low complexity without an additional computational process and improve compression efficiency by deriving the intra prediction mode reusing the MPM list.

Referring to FIG. 9, blocks L0 to L3 and blocks A0 to A3 may correspond to the neighboring blocks adjacent to the current block that is an encoding target. The blocks L0 to L3 may correspond to neighboring blocks to the left of the current block. The blocks A0 to A3 may correspond to neighboring blocks above the current block. An L0 block among neighboring blocks to the left of the current block and an A0 block among neighboring blocks above the current block may be used to generate the MPM list according to the present disclosure. However, the present disclosure is not limited to the above embodiment, and any one of the L1 to L3 blocks and any one of the A1 to A3 blocks may be used in addition to the L0 block and the A0 block. The MPM list can be generated based on the intra prediction mode of the L0 block and the intra prediction mode of the A0 block.

Figure 10:
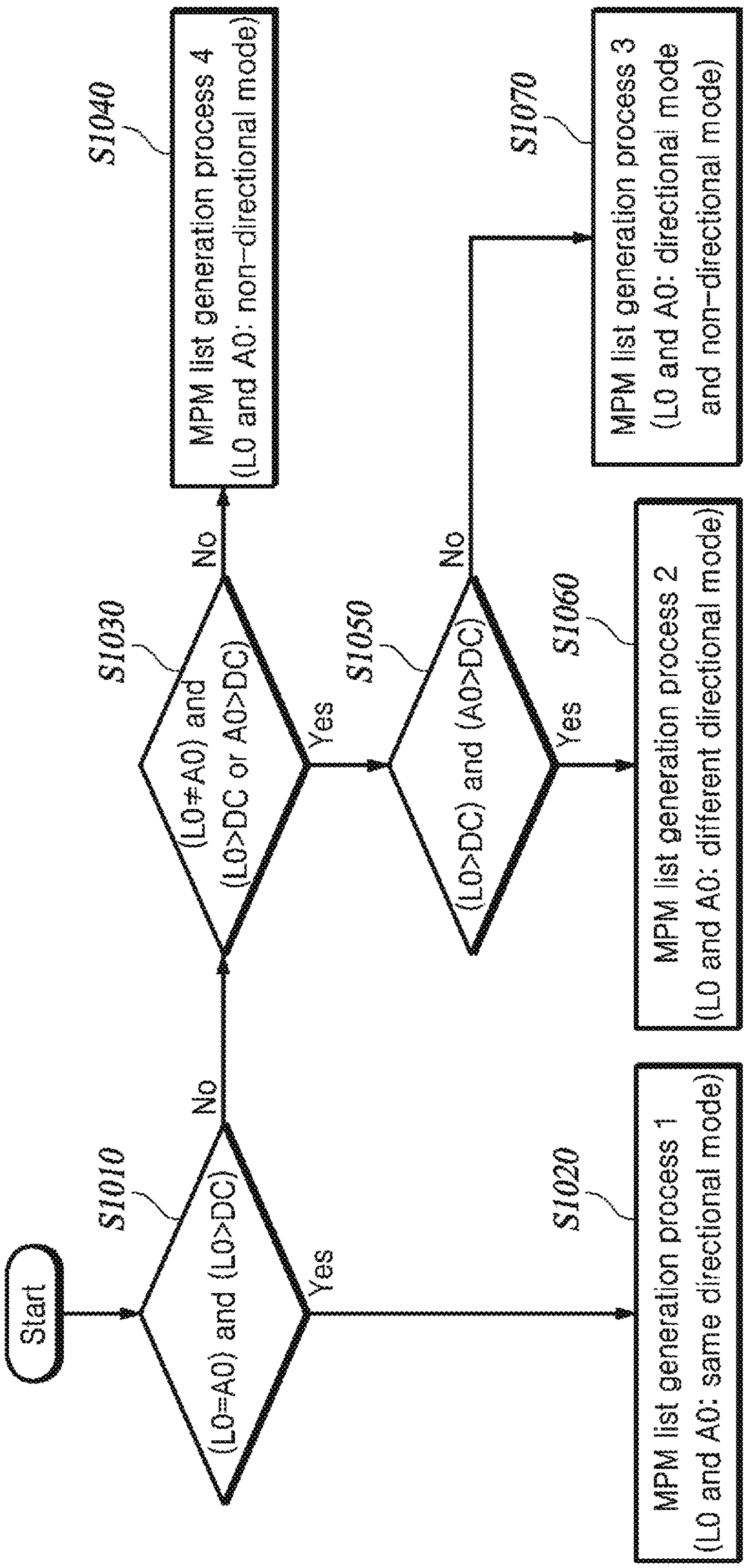
FIG. 10 is a diagram illustrating a Most Probable Mode (MPM) list generation process according to directionality of the intra prediction mode of the neighboring block according to an embodiment of the present disclosure.

FIG. 10 is a diagram illustrating a process of generating a Most Probable Mode (MPM) list according to the directionality of the intra prediction mode of the neighboring block according to an embodiment of the present disclosure. The MPM list according to the present disclosure may be generated based on the directionality of the intra prediction mode of the neighboring blocks adjacent to the current block. The MPM list generation process may be determined based on the directionality of the intra prediction mode of the neighboring blocks adjacent to the current block.

Referring to FIG. 10, the L0 block may correspond to a neighboring block to the left of the current block. The A0 block may correspond to a neighboring block above the current block. A determination may be made as to whether the intra prediction mode of the L0 block and the intra prediction mode of the A0 block are the same and whether the intra prediction mode of the L0 block is a directional mode (S1010). When the intra prediction mode of the L0 block and the intra prediction mode of the A0 block are the same and the intra prediction mode of the L0 block is the directional mode (S1010-YES), an MPM list can be generated according to MPM list generation process 1 (S1020). Here, the intra prediction mode of the L0 block and the intra prediction mode of the A0 block may correspond to intra prediction modes with the same directionality. When the intra prediction mode of the L0 block and the intra prediction mode of the A0 block are not the same or the intra prediction mode of the L0 block is not a directional mode (S1010-NO), a determination may be made as to whether the intra prediction mode of the L0 block and the intra prediction mode of the A0 block are different, and whether the intra prediction mode of the L0 block is the directional mode or the intra prediction mode of the A0 block is the directional mode (S1030). When the intra prediction mode of the L0 block and the intra prediction mode of the A0 block are non-directional modes (S1030-NO), the MPM list may be generated according to MPM list generation process 4 (S1040). Here, the intra prediction mode of the L0 block and the intra prediction mode of the A0 block may correspond to a non-directional mode. When the intra prediction mode of the L0 block and the intra prediction mode of the A0 block are different and the intra prediction mode of the L0 block is a directional mode or the intra prediction mode of the A0 block is a directional mode (S1030-YES), a determination may be made as to whether the intra prediction mode of the L0 block is the directional mode and whether the intra prediction mode of the A0 block is the directional mode (S1050). When the intra prediction mode of the L0 block is the directional mode and the intra prediction mode of the A0 block is the directional mode (S1050-YES), the MPM list can be generated according to MPM list generation process 2 (S1060). Here, the intra prediction mode of the L0 block and the intra prediction mode of the A0 block may correspond to different directional modes. When there is one non-directional mode among the intra prediction mode of the L0 block and the intra prediction mode of the A0 block (S1050-NO), the MPM list may be generated according to MPM list generation process 3 (S1070). Here, the intra prediction mode of the L0 block may correspond to the directional mode and the intra prediction mode of the A0 block may correspond to the non-directional mode. Alternatively, the intra prediction mode of the L0 block may be the non-directional mode and the intra prediction mode of the A0 block may be the directional mode.

An MPM list generation process according to the directionality of the intra prediction mode of the neighboring block described with reference to FIG. 10 is an example, and the MPM list generation process according to the present disclosure is not limited to the example illustrated in FIG. 10. For example, some of the steps illustrated in FIG. 10 may be omitted, and steps other than those illustrated in FIG. 10 may be added at any position in the flowchart of FIG. 10. Further, some of the steps illustrated in FIG. 10 may be performed simultaneously with other steps or order thereof may be changed with respect to the other steps.

FIG. 11 is a diagram illustrating the directionality of the intra prediction mode of the neighboring block according to the MPM list generation process according to an embodiment of the present disclosure. The directional modes may correspond to modes having directionality from mode 2 to mode 66 in the intra prediction mode. The non-directional mode may correspond to the planar mode and the DC mode.

Referring to FIG. 11, the L0 block may correspond to a neighboring block to the left of the current block. The A0 block may correspond to a neighboring block above the current block. When the MPM list is generated according to MPM list generation process 1, the intra prediction mode of L0 and the intra prediction mode of A0 may correspond to the same directional mode. When the MPM list is generated according to MPM list generation process 2, the intra prediction mode of L0 and the intra prediction mode of A0 may correspond to different directional modes. When the MPM list is generated according to MPM list generation process 3, the intra prediction mode of L0 may correspond to the directional mode and the intra prediction mode of A0 may correspond to non-directional mode. Alternatively, the intra prediction mode of L0 may correspond to a non-directional mode and the intra prediction mode of A0 may correspond to a directional mode. When the MPM list is generated according to MPM list generation process 4, the intra prediction mode of L0 and the intra prediction mode of A0 may correspond to the same non-directional mode. Alternatively, the intra prediction mode of L0 and the intra prediction mode of A0 may correspond to different non-directional modes.

Figure 12:
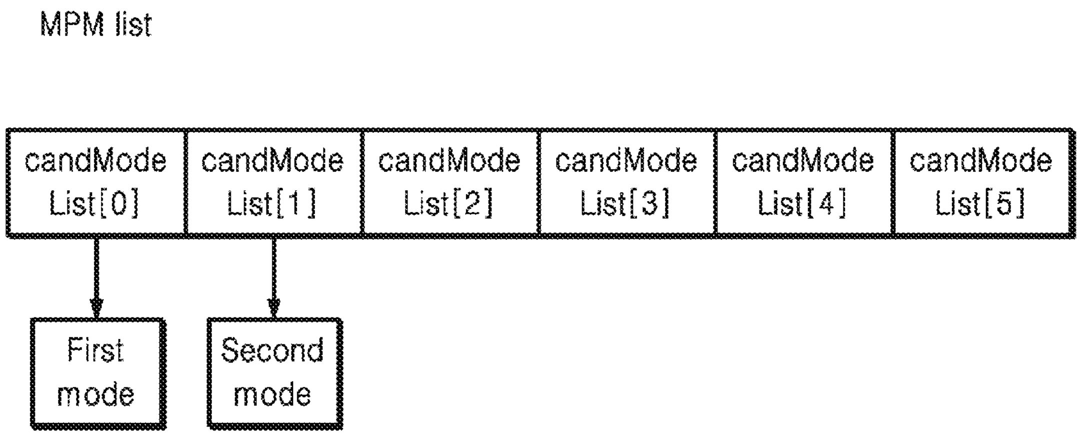
FIG. 12 is a diagram illustrating a method of selecting two modes from an MPM list according to an embodiment of the present disclosure.

FIG. 12 is a diagram illustrating a method of selecting two modes from the MPM list according to an embodiment of the present disclosure. A process of generating the MPM list based on the intra prediction mode of the neighboring blocks of the current block of the present disclosure may be conceptually similar to a process of applying a Sobel filter to pixels of the neighboring blocks of the current block to calculate a gradient of the pixel and generating a histogram of the gradient based on the gradient. In the process of generating the MPM list of the present disclosure, the directionality of the intra prediction mode of the neighboring block may be predicted through the intra prediction mode of the neighboring block. In the process of generating the histogram of the gradient of the neighboring pixel, the directionality of the intra prediction mode of the neighboring block may be predicted by calculating the gradient of the pixel of the neighboring block. Therefore, a method of deriving the intra prediction mode of the current block based on the MPM list may be used instead of a method of deriving the intra prediction mode of the current block based on the histogram of the gradient of the neighboring pixel.

Referring to FIG. 12, the MPM list according to the present disclosure may be generated and the MPM list may consist of six candidate modes. A first candidate mode (candModeList [0]) and a second candidate mode (candModeList [1]) in the MPM list can be selected as two derivation modes. The first candidate mode (candModeList [0]) and the second candidate mode (candModeList [1]), which are the two derived modes selected from the MPM list, may correspond to the first mode and the second mode, which are the two derived modes selected based on the histogram of the neighboring pixel gradients. However, the present disclosure is not limited to the above embodiment. The number of candidate modes in the MPM list may correspond to any number of candidate modes other than 6. The first candidate mode (candModeList [0]) and the second candidate mode (candModeList [1]), which are the two derived modes selected from the MPM list, may be the same as the intra prediction mode of the two neighboring blocks adjacent to the current block used to generate the MPM list.

A method of selecting two derivation modes from the MPM list according to the present disclosure may not require additional processes since the first candidate mode and the second candidate mode are selected as two derivation modes from the generated MPM list. Accordingly, complexity can be reduced and encoding/decoding efficiency can be improved. On the other hand, a method of selecting two guidance modes based on the histogram of the gradient of the neighboring pixel may be highly complex since gradient calculation through a Sobel filter operation for the neighboring pixels is required.

FIG. 13 is a diagram illustrating the DIMD blend mode according to the MPM list generation process and the directionality of the intra prediction mode of the neighboring block according to an embodiment of the present disclosure.

Referring to FIG. 13, the L0 block may correspond to a neighboring block to the left of the current block. The A0 block may correspond to a neighboring block above the current block. The L0 mode and the A0 mode may correspond to the L0 intra prediction mode and the A0 intra prediction mode, respectively. The L0 mode and the A0 mode may correspond to two modes selected as the first candidate mode and the second candidate mode from the MPM list generated according to the present disclosure. When the MPM list generation process is generation process 1 and the L0 mode and the A0 mode are the same directional mode, the DIMD blend mode may correspond to a mode in which the same directional mode is blended with the planar mode. When the MPM list generation process is generation process 2 and the L0 mode and the A0 mode are different directional modes, the DIMD blend mode corresponds to a mode in which the L0 mode is blended with the A0 mode, or the DIMD blend mode may correspond to a mode in which the L0 mode, the A0 mode and the planar mode are blended. When the MPM list generation process is generation process 3 and the L0 mode and the A0 mode are directional mode and non-directional mode, respectively, or the L0 mode and the A0 mode are non-directional mode and directional mode, respectively, the DIMD blend mode may correspond to a mode in which a mode that is the directional mode between the L0 mode and the A0 mode, and the planar mode are blended. When the MPM list generation process is generation process 4 and the L0 mode and the A0 mode are the same non-directional mode or different non-directional modes, the intra prediction mode may not be derived based on the DIMD. In the present disclosure, the DIMD blend mode can be derived directly from the two derivation modes determined according to the MPM list generation process. Even when the MPM list generation process changes, the MPM list generation process may be classified with reference to the intra prediction mode of the neighboring blocks adjacent to the current block. The DIMD blend mode may be determined based on the changed MPM list generation process.

FIG. 14 is a diagram illustrating a weight value assigned to a prediction value according to the intra prediction mode of the surrounding block according to the MPM list generation process and the directionality of the intra prediction mode of the neighboring block according to an embodiment of the present disclosure. According to the present disclosure, a method of deriving an intra prediction mode from the MPM list can generate a final prediction block of the current block by reflecting weight values to prediction values based on both the two derivation modes selected from the MPM list and the planar mode. In a method of deriving an intra prediction mode based on the histogram of the gradient of the neighboring pixel, a weight value may be determined based on the gradient of the neighboring pixel.

Referring to FIG. 14, the L0 block may correspond to a neighboring block to the left of the current block. The L0 mode and the A0 mode may correspond to the L0 intra prediction mode and the A0 intra prediction mode, respectively. Assignment of the weight value to the L0 mode and the A0 mode may mean assignment of the weight value to the prediction value according to the L0 mode and the A0 mode. The A0 block may correspond to a neighboring block above the current block. According to the MPM list generation process and the L0 mode and the A0 mode, a fixed weight value may be assigned to the prediction values according to the L0 mode, the A0 mode, and the planar mode. When the MPM list generation process is generation process 1 and the L0 mode and the A0 mode are the same directional mode, a ⅔ weight value may be assigned to the prediction value according to the same directional mode, and a ⅓ weight value may be assigned to the prediction value according to the planar mode. When the MPM list generation process is generation process 2 and the L0 mode and the A0 mode are different directional modes, a ½ weight value is assigned to the prediction value according to the L0 mode, a ½ weight value is assigned to the prediction value according to the A0 mode, or a ¼ weight value may be assigned to the prediction value according to the L0 mode, a ¼ weight value may be assigned to the prediction value according to the A0 mode, and a ½ weight value may be assigned to the prediction value according to the planar mode. When the MPM list generation process is generation process 3 and the L0 mode and the A0 mode are directional mode and non-directional mode, respectively, or the L0 mode and the A0 mode are non-directional mode and directional mode, respectively, a ½ weight value may be assigned to a prediction value according to a mode that is the directional mode among the L0 mode and the A0 mode, and a ½ weight value may be assigned to the prediction value according to the planar mode. When the MPM list generation process is generation process 4 and the L0 mode and the A0 mode are the same non-directional modes or different non-directional modes, the intra prediction mode may not be derived based on the DIMD. However, the present disclosure is not limited to the above embodiments. According to the MPM list generation process, the L0 mode, and the A0 mode, arbitrary weight values may be assigned to prediction values according to the L0 mode, the A0 mode, and the planar mode.

Figure 15:
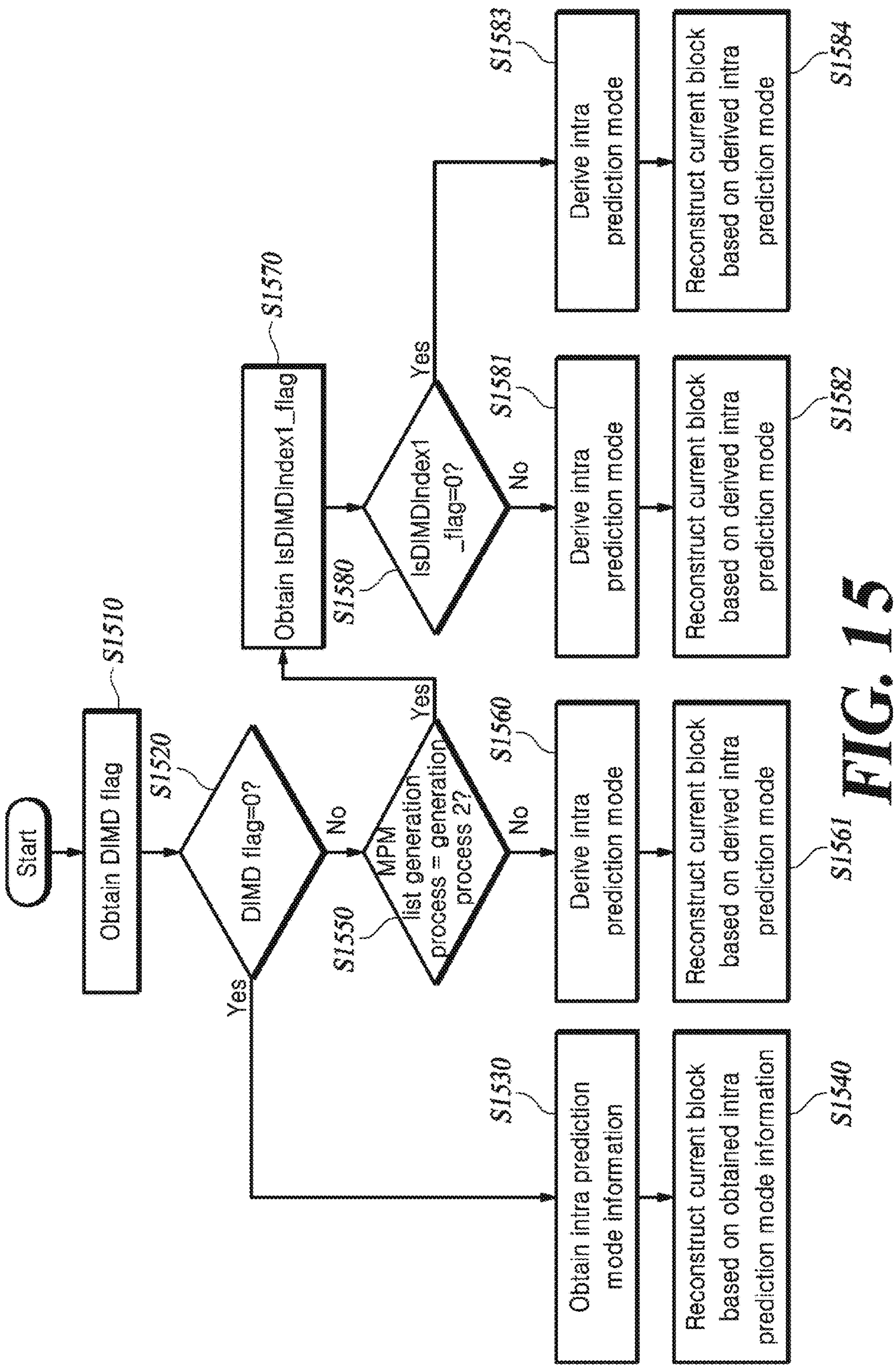
FIG. 15 is a diagram illustrating a DIMD-based decoding process according to another embodiment of the present disclosure.

FIG. 15 is a diagram illustrating a DIMD-based decoding process according to another embodiment of the present disclosure. The L0 block may correspond to a neighboring block to the left of the current block. The A0 block may correspond to a neighboring block above the current block. The L0 mode and the A0 mode may correspond to the L0 intra prediction mode and the A0 intra prediction mode, respectively. The assignment of the weight value to the L0 mode and the A0 mode may mean the assignment of the weight value to the prediction value according to the L0 mode and the A0 mode. In the method of deriving the intra prediction mode based on the histogram of the gradient of the neighboring pixel, a DIMD index-related syntax is transmitted from the encoder to the decoder so that a DIMD blend mode to be used by the current block can be distinguished. On the other hand, in a method of deriving the intra prediction mode based on the MPM list, since the DIMD blend mode and the weight value can be derived based on the MPM list generation process and the intra prediction mode of the neighboring block, the DIMD index-related syntax may not be transmitted from the encoder to the decoder. However, in the case of MPM list generation process 2, i.e., when the L0 mode and the A0 mode are different directional modes, the DIMD blend mode may correspond to a mode in which the L0 mode is blended with the A0 mode or correspond to a mode in which the L0 mode, the A0 mode, and the planar mode are blended. Therefore, in order to distinguish between these, a separate syntax may be transmitted from the encoder to the decoder only in the case of MPM list generation process 2. For the separate syntax, in the case of MPM list generation process 2, information (for example, IsDIMDIndex1_flag) indicating whether the DIMD blend mode is a mode in which only the L0 mode and the A0 mode other than the planar mode are blended may be transmitted. When IsDIMDIndex1_flag is the first value (for example, 0), this may indicate that the DIMD blend mode is a mode in which the L0 mode, the A0 mode, and the planar mode are blended in the case of MPM list generation process 2. When IsDIMDIndex1_flag is the second value (for example, 1), this may indicate the DIMD blend mode is a mode in which only the L0 mode and the A0 mode other than the planar mode are blended, in the case of MPM list generation process 2.

Referring to FIG. 15, the decoding apparatus may obtain the DIMD flag (S1510). A determination may be made as to whether the DIMD flag has the first value (for example, 0) (S1520). When the DIMD flag has the first value (for example, 0) (S1520-YES), the decoding apparatus may obtain the intra prediction mode information (S1530). The decoding apparatus may reconstruct the current block based on the obtained intra prediction mode information (S1540). When the DIMD flag does not have the first value (for example, 0) (S1520-NO), a determination may be made as to whether the MPM list generation process is generation process 2 (S1550).

When the MPM list generation process is not generation process 2 (S1550-NO), the decoding apparatus may derive the intra prediction mode (S1560). Here, in the step of deriving the intra prediction mode, the intra prediction mode may be derived from the MPM list generated according to MPM list generation process 1 or 3. In the case of MPM list generation process 1, the L0 mode and the A0 mode may be the same directional mode, and the derived intra prediction mode may correspond to a mode in which the same directional mode and the planar mode are blended. In the case of MPM list generation process 3, the L0 mode and the A0 mode may be the directional mode and the non-directional mode, respectively, or the non-directional mode and the directional mode, respectively, and the derived intra prediction mode may correspond to a mode in which a mode that is a directional mode among the L0 mode and the A0 mode and the planar mode are blended. The decoding apparatus may reconstruct the current block based on the derived intra prediction mode (S1561).

When the MPM list generation process is generation process 2 (S1550-YES), the decoding apparatus may obtain IsDIMDIndex1_flag (S1570). A determination may be made as to whether IsDIMDIndex1_flag has the first value (for example, 0) (S1580). When IsDIMDIndex1 flag does not have the first value (for example, 0) (S1580-NO), the decoding apparatus may derive an intra prediction mode (S1581). Here, the derived intra prediction mode may correspond to a mode in which only the L0 mode and the A0 mode other than the planar mode are blended. The decoding apparatus may reconstruct the current block based on the derived intra prediction mode (S1582). When IsDIMDIndex1_flag has the first value (for example, 0) (S1580-YES), the decoding apparatus may derive the intra prediction mode (S1583). Here, the derived intra prediction mode may correspond to a mode in which the L0 mode, the A0 mode, and the planar mode are blended. The decoding apparatus may reconstruct the current block based on the derived intra prediction mode (S1584).

In a method of deriving the intra prediction mode based on the MPM list according to the present disclosure, since a Sobel filter process is not applied to the neighboring pixels, the weight value is not determined based on the gradient, and a fixed weight value is applied unlike the method of deriving the intra prediction mode based on the histogram of the gradient of the neighboring pixel, complexity can be reduced. Further, in the method of deriving the intra prediction mode based on the MPM list, since it is not necessary to transmit DIMD index information unlike the method of deriving the intra prediction mode based on the histogram of the gradient of the neighboring pixel, the number of bits decreases and encoding/decoding efficiency can be improved. Further, in the method of deriving the intra prediction mode based on the MPM list, since the gradient of the neighboring pixel is not calculated, two modes are selected from the MPM list, and a fixed weight value is applied unlike the method of deriving the intra prediction mode based on the histogram of the gradient of the neighboring pixel, complexity can be reduced.

Figure 16:
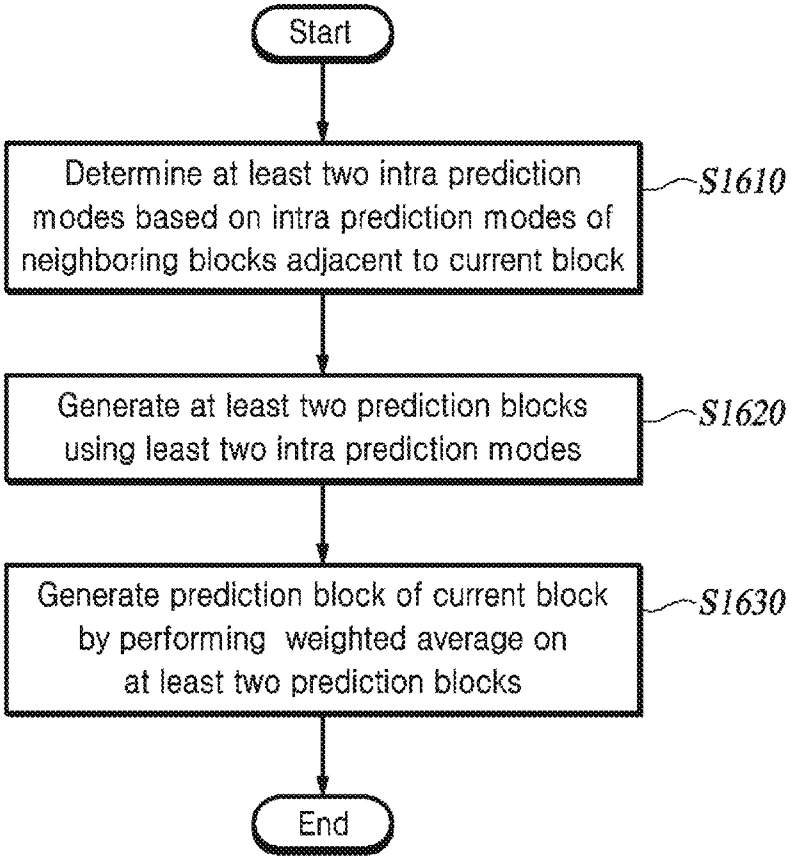
FIG. 16 is a diagram illustrating a video decoding process according to an embodiment of the present disclosure.

FIG. 16 is a diagram illustrating a video decoding process according to an embodiment of the present disclosure.

Referring to FIG. 16, at least two intra prediction modes may be determined based on the intra prediction modes of the neighboring blocks adjacent to the current block (S1610). The neighboring blocks adjacent to the current block may correspond to neighboring blocks to the left and on the current block. The at least two intra prediction modes are candidate modes selected from the MPM list and may correspond to the first candidate mode and the second candidate mode. The intra prediction mode information of the current block may be obtained based on that the at least two intra prediction modes are non-directional modes, and the prediction block of the current block may be generated based on the obtained intra prediction mode information. At least two prediction blocks may be generated using the at least two intra prediction modes (S1620). A prediction block using the planar mode and a prediction block using the same directional mode may be generated based on that the at least two intra prediction modes are the same directional mode. The prediction block using the planar mode and the prediction block using the directional mode may be generated based on that the at least two intra prediction modes are a directional mode and a non-directional mode, respectively. First information indicating whether to use only the at least two intra prediction modes other than the planar mode may be obtained based on that the at least two intra prediction modes are different directional modes. The at least two prediction blocks may be generated using the at least two intra prediction modes based on that the first information indicates that only the at least two intra prediction modes other than the planar mode are used. The prediction block using the planar mode and the at least two prediction blocks using the at least two intra prediction modes may be generated based on that the first information does not indicate that only the at least two intra prediction modes other than the planar mode are used.

The prediction block of the current block can be generated by performing a weighted average on the at least two prediction blocks (S1630). The weighted average being performed on the at least two prediction blocks so that the prediction block of the current block can be generated may be characterized by assigning a fixed weight value to the at least two prediction blocks and adding these.

Figure 17:
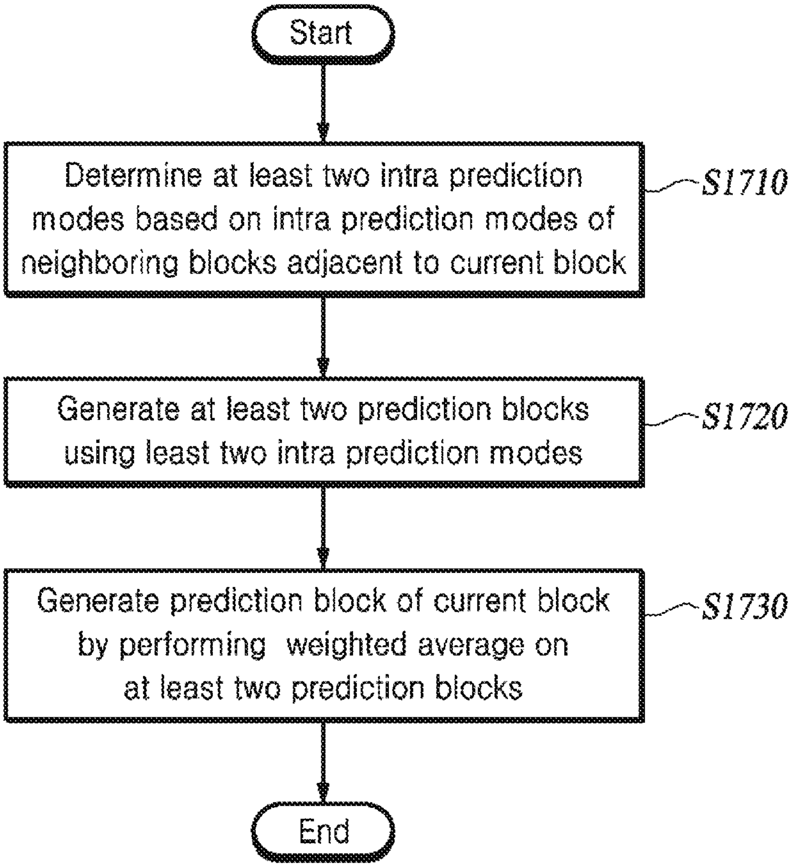
FIG. 17 is a diagram illustrating a video encoding process according to an embodiment of the present disclosure.

FIG. 17 is a diagram illustrating a video encoding process according to an embodiment of the present disclosure.

Referring to FIG. 17, the at least two intra prediction modes may be determined based on the intra prediction modes of the neighboring blocks adjacent to the current block (S1710). The neighboring blocks adjacent to the current block may correspond to neighboring blocks to the left and on the current block. The at least two intra prediction modes are candidate modes selected from the MPM list and may correspond to the first candidate mode and the second candidate mode. The intra prediction mode information of the current block may be encoded based on that the at least two intra prediction modes are non-directional modes. At least two prediction blocks may be generated using the at least two intra prediction modes (S1720). The prediction block using the planar mode and the prediction block using the same directional mode may be generated based on that the at least two intra prediction modes are the same directional mode. The prediction block using the planar mode and the prediction block using the directional mode may be generated based on that the at least two intra prediction modes are a directional mode and a non-directional mode, respectively. The first information indicating whether to use only the at least two intra prediction modes other than the planar mode may be encoded based on that the at least two intra prediction modes are different directional modes. The at least two prediction blocks may be generated using the at least two intra prediction modes based on that the first information indicates that only the at least two intra prediction modes other than the planar mode are used. The prediction block using the planar mode and the at least two prediction blocks using the at least two intra prediction modes may be generated based on that the first information does not indicate that only the at least two intra prediction modes other than the planar mode are used.

The prediction block of the current block can be generated by performing a weighted average on the at least two prediction blocks (S1730). The weighted average being performed on the at least two prediction blocks so that the prediction block of the current block can be generated may be characterized by assigning a fixed weight value to the at least two prediction blocks and adding these.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMBER

122: intra predictor
510: entropy decoder
542: intra predictor

What is claimed is:

1. A video decoding apparatus comprising:
a memory; and
one or more processors configured to:
determine at least two intra prediction modes based on intra prediction modes of neighboring blocks of a current block;
generate at least two prediction blocks using the at least two intra prediction modes; and
generate a prediction block of the current block by performing a weighted average on the at least two prediction blocks.

2. The video decoding apparatus of claim 1, wherein the at least two intra prediction modes are candidate modes selected from a Most Probable Mode (MPM) list.

3. The video decoding apparatus of claim 2, wherein the at least two intra prediction modes are a first candidate mode and a second candidate mode in the MPM list.

4. The video decoding apparatus of claim 1, wherein the one or more processors is further configured to:
obtain intra prediction mode information of the current block based on that the at least two intra prediction modes are non-directional modes; and
generate the prediction block of the current block based on the intra prediction mode information.

5. The video decoding apparatus of claim 1, wherein the at least two intra prediction modes which are the same directional mode,
wherein the one or more processors is configured to the prediction block of the current block by performing a process comprising:
generating a prediction block using a planar mode; and
generating the prediction block of the current block by performing the weighted average on the prediction block generated using the planar mode and a prediction block generated using the same directional mode.

6. The video decoding apparatus of claim 1, wherein the at least two intra prediction modes are different directional modes,
wherein the one or more processors is configured to generate the prediction block of the current block by performing a process comprising:
generating a prediction block using a planar mode; and
generating the prediction block of the current block by performing the weighted average on the prediction block generated using the planar mode and the at least two prediction blocks generated using the different directional modes.

7. The video decoding method of claim 1, wherein the one or more processors is further configured to:
generate the prediction block of the current block by assigning fixed weight values to the at least two prediction blocks and adding these.

8. A video encoding apparatus comprising:
a memory; and
one or more processors configured to:
determine at least two intra prediction modes based on intra prediction modes of neighboring blocks of a current block;
generate at least two prediction blocks using the at least two intra prediction modes; and
generate a prediction block of the current block by performing a weighted average on the at least two prediction blocks.

9. The video encoding apparatus of claim 8, wherein the at least two intra prediction modes are selected from an MPM list and are a first candidate mode and a second candidate mode from the MPM list.

10. The video encoding apparatus of claim 8, wherein the one or more processors is further configured to:
encode intra prediction mode information of the current block based on that the at least two intra prediction modes are non-directional modes.

11. The video encoding apparatus of claim 8, wherein the at least two intra prediction modes which are the same directional mode,
wherein the one or more processors is configured to the prediction block of the current block by performing a process comprising:
generating a prediction block using a planar mode; and
generating the prediction block of the current block by performing the weighted average on the prediction block generated using the planar mode and a prediction block generated using the same directional mode.

12. The video encoding apparatus of claim 8, wherein the at least two intra prediction modes are different directional modes,
wherein the one or more processors is configured to generate the prediction block of the current block by performing a process comprising:
generating a prediction block using a planar mode; and
generating the prediction block of the current block by performing the weighted average on the prediction block generated using the planar mode and the at least two prediction blocks generated using the different directional modes.

13. The video encoding apparatus of claim 8, wherein the one or more processors is further configured to:

generate the prediction block of the current block by assigning fixed weight values to the at least two prediction blocks and adding these.

14. A method for providing a video decoding apparatus with video data, the method comprising:

encoding the video data into a bitstream; and transmitting the bitstream to the video decoding apparatus, wherein encoding the video data comprises:

determining at least two intra prediction modes based on intra prediction modes of neighboring blocks of a current block;

generating at least two prediction blocks using the at least two intra prediction modes; and generating a prediction block of the current block by performing a weighted average on the at least two prediction blocks.

* * * * *